US009401070B1

(12) United States Patent
Young et al.

(10) Patent No.: US 9,401,070 B1
(45) Date of Patent: Jul. 26, 2016

(54) GAMING SYSTEM AND METHOD FOR IDENTIFYING AND HANDLING STRICTLY FRACTIONAL CREDIT PORTIONS

(71) Applicant: Respin LLC, Reno, NV (US)

(72) Inventors: Kent Young, Reno, NV (US); Cyrus Luciano, Reno, NV (US)

(73) Assignee: Respin LLC, Reno, NV (US)

( * ) Notice: Subject to any disclaimer, the term of this patent is extended or adjusted under 35 U.S.C. 154(b) by 0 days.

(21) Appl. No.: 14/715,936

(22) Filed: May 19, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3244* (2013.01); *G07F 17/3204* (2013.01)

(58) Field of Classification Search
USPC .......................................... 463/20, 22, 25, 30
See application file for complete search history.

(56) References Cited

U.S. PATENT DOCUMENTS

| | | | | |
|---|---|---|---|---|
| 6,296,569 | B1 * | 10/2001 | Congello, Jr. | G07F 17/32 273/138.1 |
| 7,241,221 | B1 * | 7/2007 | Luciano, Jr. | G07F 17/32 463/20 |
| 2009/0156298 | A1 * | 6/2009 | Roach | G07F 17/3244 463/25 |
| 2011/0021265 | A1 * | 1/2011 | Luciano | G07F 17/32 463/25 |

* cited by examiner

*Primary Examiner* — Adetokunbo O Torimiro
(74) *Attorney, Agent, or Firm* — Marc D. Foodman; Ferdinand IP

(57) ABSTRACT

A gaming system and method for identifying and handling strictly fractional credit portions. The system and method is used in games that offer credit values that do not fall within a recognized denomination. For example, a game in which 1 credit is equal to 0.1¢ or another acceptable fractional value. The strictly fractional credit portions are subject to a secondary or special game procedure prior to cash-out by the player that guarantees a specified theoretical return to the player, while at the same time allowing for an exciting game experience upon cash out.

18 Claims, 11 Drawing Sheets

GAMING SYSTEM AND METHOD FOR IDENTIFYING AND HANDLING STRICTLY FRACTIONAL CREDIT PORTIONS

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Electronic gaming machines ("EGMs") offer a variety of games such as slot games, video poker games, roulette games, keno games and other types of wagering games that are commonly deployed at a casino for use by players. Play on the EGMs typically requires the player to place a wager on the outcome of a primary game. On many such EGMs, secondary games or bonus rounds are also available after the player qualifies by attaining a certain winning combination or event on or related to the primary game. The player would then enter the secondary game or bonus round where they have an opportunity to win extra game credits, game tokens or other awards. In the case of 'game credits' that are awarded during base play or bonus play, they are typically added on to the credit meter total on the EGM and provided to the player upon completion of a gaming session when the player "cashes out."

Historically, upon cash out, the player was given the equivalent cash value of the credits remaining on the EGM credit meter in the form of coins deposited into a coin tray of the EGM from a coin hopper that stored quantities of coins inside the cabinet of the EGM. Alternatively, an EGM could dispense bills or a "hand pay" could be performed by a floor attendant who would come to the EGM where the player was playing and pay them in cash for the number of credits on the machine.

In recent years, the market for EGMs has moved away from cash based payout systems to cashless systems that dispense printed tickets with bar codes that can be inserted into the bill validator of any EGM on the casino floor, or exchanged for cash at a casino cage or a cash-out kiosk. EGMs have also been enabled to dispense or reload cash cards that use a magnetic stripe or smart card technology for storing a cash value to minimize the need for cash and coin handling in the EGMs.

In this context, it has become commonplace to represent currency in the form of game credits. Typically, it is the case that the specified credit value on a given game will be equivalent to a recognized available denomination in the target currency. For example, in many slot games in commercial use throughout the United States today, 1 credit is equal to 1¢. In these games, cashing out the remaining credit value on a game is straightforward as the credit value may be converted directly into the specified currency value as a linear combination of recognized available denominations.

The present invention is directed to a gaming system and method that uses credit values which are not equivalent to an available recognized denomination in the target currency. For example, a game in which 1 credit is equal to 0.1¢. In this case, it follows that cashing out the remaining credit value on a game is not straightforward as the total credit value may result in a fractional denomination value that cannot be paid directly to the player. The natural method that is resorted to when dealing with these fractional credit portions is to round up or down. This method is rationalized because the residual amount that is neglected in the rounding process is so small. However, over a large number of transactions, the total amount won or lost through this rounding process can never be specified or altered. The method described in the present invention allows for the identification and handling of these nonzero strictly fractional credit portions in such a way as to guarantee a specified theoretical return to the player while at the same time allowing for an exciting secondary game experience upon cash out.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION OF THE INVENTION

Figure 1A:
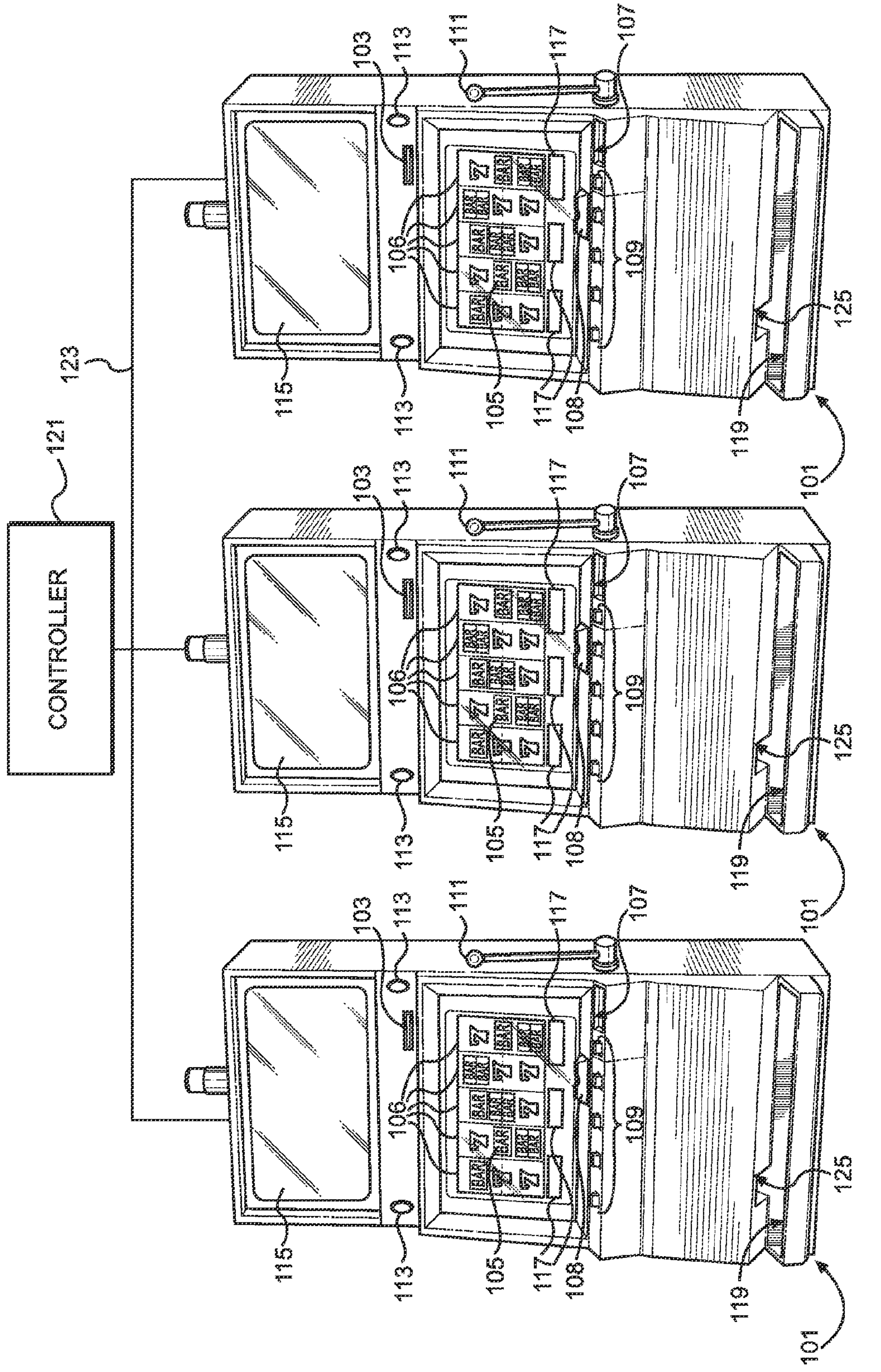
FIG. 1A PRIOR ART
FIG. 1A shows prior art electronic gaming machines for playing a game connected to a network controlled by a server.

The present invention will now be described more fully with reference to the accompanying drawings. It should be understood that the invention may be embodied in many different forms and should not be construed as limited to the embodiments set forth herein. Throughout FIGS. 1-5, like elements of the invention are referred to by the same reference numerals for consistency purposes.

Due to the fact that this particular gaming system and method has not been in use previously, a number of new terms are defined herein to assist in articulating the detailed description of the invention. An acceptable fractional denomination credit is defined based on three criteria. First, it is defined to be a specified value not equivalent to a recognized available denomination in the target currency. For example, a credit with a specified value of 0.1¢ in the currency of US dollars would be considered an acceptable fractional denomination credit. For the purposes of the described invention, an acceptable fractional denomination credit is further defined to be less than the least available recognized denomination in the target currency. Finally, the credit value of an acceptable fractional denomination credit is defined such that a positive integer multiple of the credit value is equivalent to the least available recognized denomination in the target currency. Together, these three conditions ensure that a given monetary value may be converted to a whole number of credits while concurrently allowing for proper identification and handling of a strictly fractional credit portion. Thus, as an example, given the target currency of US dollars, the least available recognized denomination is 1¢. Consequently, a credit value of 0.1¢ would be an acceptable fractional denomination credit since we have that both 0.1¢<1¢ and 10×0.1¢=1¢.

With this in mind, given a set acceptable fractional denomination credit value, we may define that which is meant by a strictly fractional credit portion. This definition rests on the notion of congruence of numbers through modular, or clock, arithmetic. Specifically, for a given positive integer, n, we say that two numbers, a and b, are congruent modulo n if their difference, a−b, is divisible by n. For example, 8 and 4 are congruent modulo 2 since 8−4=4, and 2 evenly divides 4. We will call n the congruence multiple. From this concept, we obtain the modulo operation wherein it follows that a mod n yields the Euclidean remainder of a divided by n. That is, for example, 4 mod 2=0, 6 mod 4=2, 4 mod 6=4, and so on.

Looking back to the definition of an acceptable fractional denomination credit, it is clear that, given a set number, a, of acceptable fractional denomination credits, the strictly fractional credit portion is defined as a mod n, where n is the multiple such that the value of n fractional denomination credits is equivalent to the least available recognized denomination. Note that, inherent in the definition of a strictly fractional credit portion is the method by which the strictly fractional credit portion of an amount of acceptable fractional denomination credits is identified. In the example in which we are operating in US dollars with 1 credit equivalent to 0.1¢, it follows from above that the congruence multiple will be 10 since 10×0.10=10. Consequently, if we have 100 such credits, it follows that the strictly fractional credit portion is equivalent to zero due to the fact that 100 mod 10=0. On the other hand, if we have 107 credits, then the strictly fractional credit portion will be 7 since 107 mod 10=7. Using this definition, we break a given number of credits into a payable portion and a strictly fractional portion. In the example above of 100 credits, we have 100 payable credits equivalent to a monetary value of 10¢, and we have 0 strictly fractional credits. In the example of 107 credits, we have 100 payable credits equivalent to a value of 10¢ and 7 strictly fractional credits with a monetary value of 0.7¢.

FIG. 1A shows a group of prior art electronic gaming machines ("EGM") connected to a central controller. Each EGM 101 is a wagering device that is used in a casino (or other gaming establishment) and may be configured to display and play any of a number of different types of games, including but not limited to spinning reel type slot games, video reel games, video poker, keno, roulette, craps, blackjack, bingo or any other type of wagering game.

A group of EGMs 101 forms a bank that may be connected together for different types of system applications. For example, a group of EGMs 101 may be linked together for bonusing in a variety of ways, including progressive bonuses where a portion of an amount wagered is applied to a progressive meter that advances as additional games are played. It is also common for EGMs in a casino establishment to be connected to systems for player tracking so that the casino can keep track of the amount of play by each individual player. In that case, each player is issued a player tracking device such as a card that is inserted into a card slot 103 on EGM 101 during play. The card identifies the player to the system and all wagered amounts are tracked for loyalty rewards and other marketing programs of the casino. Other systems connecting EGMs 101 are used for accounting purposes so that a casino operator can monitor and track play, and assess performance of EGMs across the entire casino floor.

Each EGM 101 has a number of components. A display 105 is used to show game play and resulting outcomes. For a purely electronic game, such as an electronic bingo game, the display is typically in the form of a video display (shown), but for other types of games such as electromechanical slot games, the video display is replaced with physical reels. Touch screen displays are included on most EGMs and provide a flexible interface for operation of EGM 101, including displaying game cards 106 during play.

Other components include a bill validator and a coin acceptor that are both housed inside EGM 101 into which bills may be inserted through bill slot 107 and coins may be inserted through coin head 108, respectively. Buttons 109 on the exterior of EGM 101 are used to control certain EGM operations in conjunction with touch screen display 105. A handle 111 may be used to initiate play of a game and speakers 113 are used to provide sounds in conjunction with game play and other EGM operations. EGMs further include a top box 115 for displaying pay tables, artwork, advertising or other types of information either on fixed glass or on other displays such as an integrated video panel. Top box 115 may be fitted with a liquid crystal display ("LCD") screen to permit aspects of game play from either a base game or a secondary game to be shown in top box 115. Meters 117 for tracking credits available for play and other amounts are positioned near the bottom or screen 105. A coin tray 119 at the bottom of EGM 101 is used to catch coins as they are dispensed to a player. It is also common for EGM 101 to include a ticket-in, ticket-out ("TITO") component that works with the bill validator housed inside of EGM 101 that may accept bar coded credits through slot 107 and for which the value of the credits is displayed on meters 117 upon a ticket being inserted.

Figure 2:
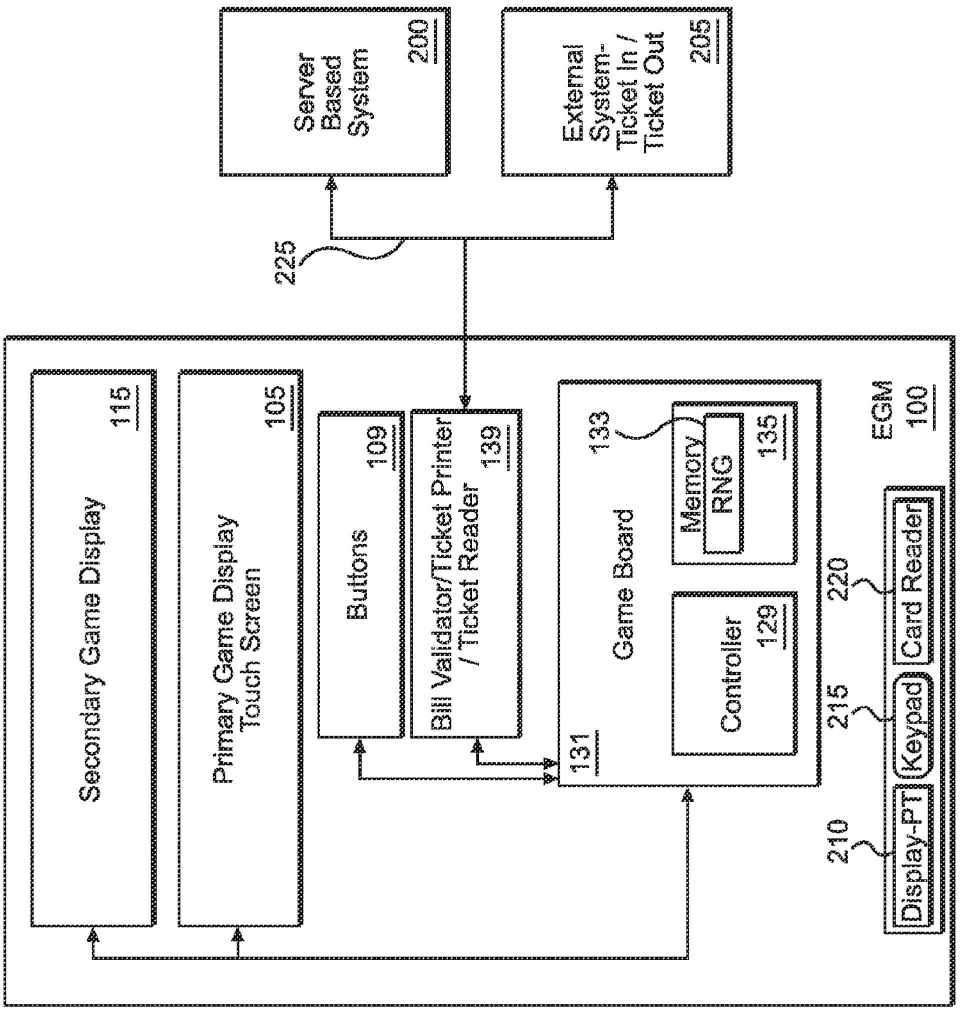
FIG. 2 PRIOR ART
FIG. 2 shows a block diagram of an electronic gaming machine for playing a game and connected to a network controlled by a central server based system with an external system also connected to the network.

All operational functions of EGM 101 are controlled by a controller 129 such as a microprocessor on a game board 131 housed in side EGM 101. Internal components are shown in FIG. 2. Controller 129 executes one or more programs and uses a random number generator ("RNG") 133 stored in a memory 135. The operation of the components on EGM game board 131, including controller 129 and memory 133, is well known to those of ordinary skill in the art. Game outcomes are determined based on results corresponding to the numbers generated by RNG 133.

In the system of FIG. 1A, EGMs 101 are connected to an external controller 121 that is used to interface with EGMs 101 to perform a number of different functions, depending on how games on EGMs 101 are configured to operate. For example, controller 121 may instruct EGMs 101 to dispense cash bonuses based on winning events on a networked bonus feature like a progressive or another independent bonus mechanism like a wheel. Controller 121 is a microprocessor based device such as a computer or server that is in two-way communication with each of the EGMs 101 in a multi-device system over a network connection 123. Controller 121 receives signals from EGM 101 that may indicate any of a number of different types of events occurring on EGM 101.

Figure 1D:
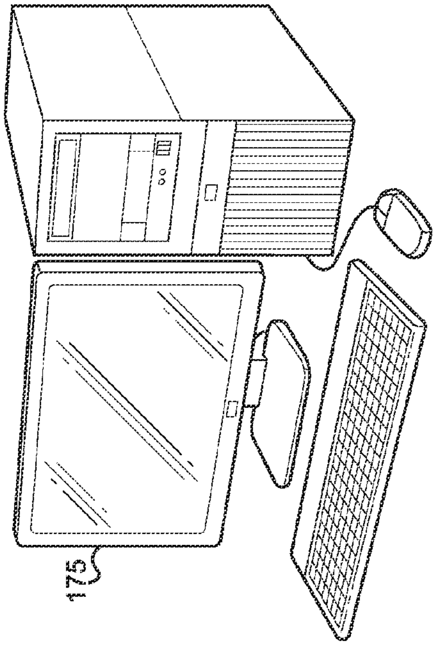
FIG. 1D PRIOR ART
FIGS. 1B-1F show prior art networked computing devices for playing a game.
Figure 1C:
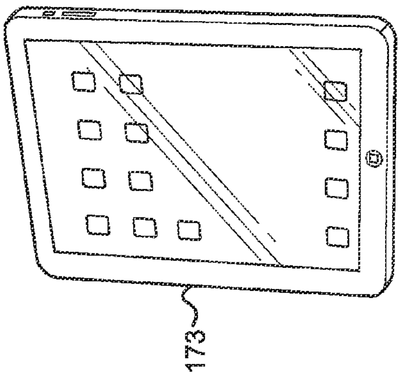
FIG. 1C PRIOR ART
Figure 1B:
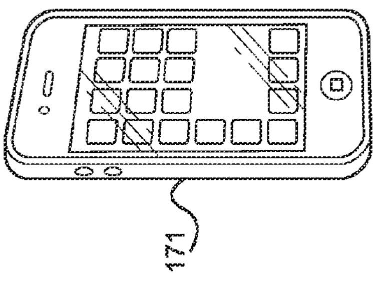
FIG. 1B PRIOR ART
Figure 1F:
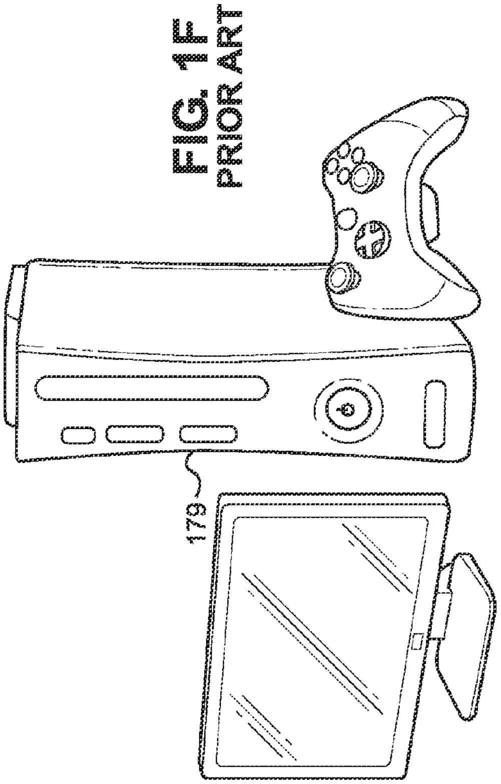
FIG. 1F PRIOR ART
Figure 1E:
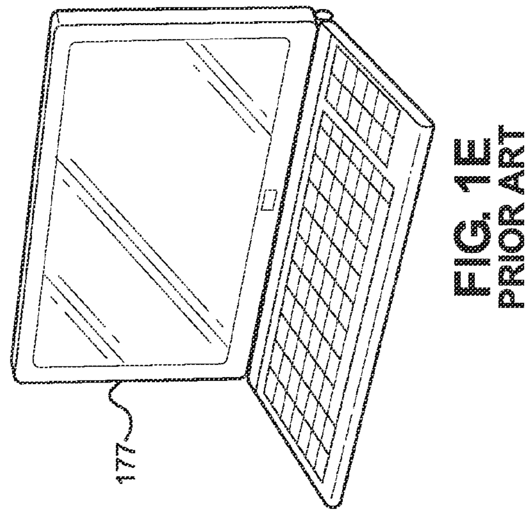
FIG. 1E PRIOR ART

FIGS. 1B-1F show a number of general purpose computing devices that may be used to play a game such as a slot game or any other wagering type game. These figures show a smartphone 171 in FIG. 1B which may be an Apple iPhone 4S® as pictured, or any other mobile phone type device. A tablet computer 173 is shown in FIG. 1C which may be an Apple iPad 3® as pictured, or any other tablet computing device. A desktop computer 175 is shown in FIG. 1D which may be a Lenovo® machine as pictured, or any other desktop computer. A laptop computer 177 is shown in FIG. 1E which may be a Lenovo® computer or any other laptop computer. And, a home video gaming device 179 is shown in FIG. 1F which may be a Microsoft Xbox® system or any other home video system. Other types of network connected devices could also be used to play games including portable video gaming devices such as a Sony PSP®, a Nintendo GameBoy®, or an internet connected television with a browser or app capabilities. Any of these devices is capable of playing a game, including a wagering game such as bingo, through an app loaded onto the device or through a website accessible using a browser on the device. In the case of the networked game, payment may be made by credit card, PayPal® or another proprietary payment service. The RNG is run securely on a server based system and then delivers the outcomes over the internet to be displayed on the general purpose computing device.

Throughout this detailed description, EGM 101 is represented as a casino gaming device. It should be understood that any one or more of the general purpose computing devices—smartphone 171, tablet computer 173, desktop computer 175, laptop computer 177, or home video gaming system 179 shown in FIGS. 1B-1F—could be placed on a network connected to server based system 201 and used to deliver a game over the network. For purposes of this specification, reference to one or more EGMs 101 in an environment using a limited access intranet of the type typically found in a casino would also apply to one or more general purpose computing devices with a secure connection to a server over the internet and not involving a physical casino property at all, and which may or may not require a wager or payment to play.

FIG. 2 is a block diagram of EGM 100 connected to an external server based system 200. Game outcomes are determined based on the random numbers selected by RNG 133. A bill validator 155 for accepting paper currency is shown integrated with a ticket reader and ticket printer. Bill validator 155 accepts currency in the form of bills or tickets from a player and adds credit to meters 125 on EGM 100.

An external system 205 may also be connected to EGM 100 for handling ticket in/ticket out operations across all EGMs on network 225. These types of systems are typically connected to EGM 100 either through a separate interface board (not shown).

It will be understood that the type of networks 225 over which data is communicated for the handling of accepting, authenticating and printing tickets, and other functionality can be one of several different types of networks. These include a Local Area Network (LAN), Wide Area Network (WAN), an intranet, the internet or other classes of networks. Any type of network technology could be used without departing from the principles of the invention. This would include communication via any protocol on any of the layers of the OSI model (ISO/IEC 7498-1) with or without encryption (e.g. SSL encryption, VPN, etc). The time is synchronized on all components of the system via a network protocol such as, for example, network time protocol ("NTP") to ensure that time stamps may be reliably compared.

Figure 3:
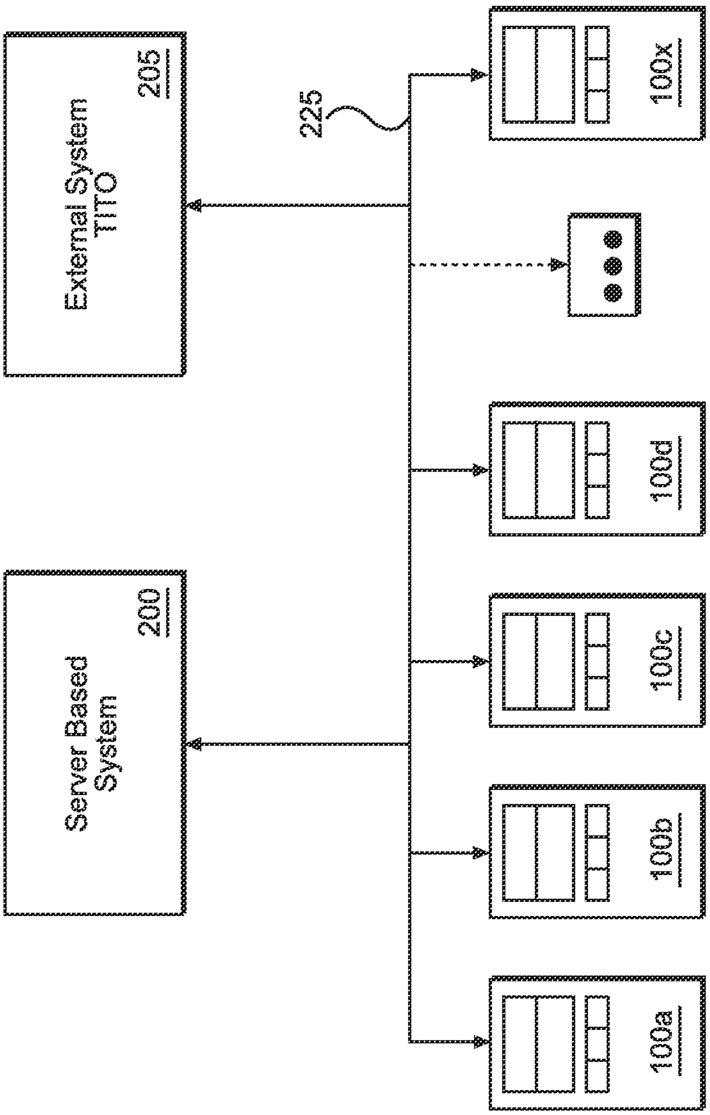
FIG. 3 Prior Art
FIG. 3 shows a block diagram of a group of electronic gaming machines on a network connected to a server based system and an external system.

FIG. 3 is a block diagram showing a prior art group of EGMs 100 *a-x* on network connection 225 between external systems 200, 205 such as a server based system and Ticket-In-Ticket-Out system, and each of EGMs 100 *a-x*. It should be understood that the network may be set up with any number of EGMs that may be in the thousands of machines. A configuration of this type is well known in the prior art and allows communications between EGMs on a casino floor with a server based system to deliver game content, and a TITO system for payment. It should be understood that general computing devices such as those shown in FIGS. 1B-1F could be connected to a server based system 200 as described above to deliver game content and results.

In offering games with acceptable fractional denomination credits on EGMs 100, it is necessary to properly provide a solution for identifying and handling any nonzero strictly fractional portion of the credit amount. Since it is not possible for a gaming operator to give a player a fraction of a cent, it is easy to recognize that the operator cannot cash out with credit values that are less than the least available denomination (e.g. less than 1¢). The question then becomes: "What does the operator do with the remaining strictly fractional credit portion?" The simple answer is to fall back to some sort of rounding algorithm, which may or may not even out in the long run. It is questionable whether or not this approach is even viable under the regulatory scheme of any particular jurisdiction. Further, players may view it as a way for the operator to take the fractional credits over large numbers of players in order to increase profits at the expense of players. Finally, from the operator's perspective, there is no way to control how much money is either taken away from or given back to the player over the long run through this rounding process.

Using the present invention, this problem is overcome. Beyond a solution to the problem, the invention provides the player with a game mechanism which holds the potential to greatly add to the overall playing experience and increase the excitement of the game. In so doing, the player wagers the strictly fractional portion of the credit amount upon cash out in a stand-alone game module that returns either zero credits or some credit amount that has no strictly fractional credit portion. In this case, the game module is detailed in the underlying game help screen and the player agrees to this wager upon placing the first wager in the underlying game. Furthermore, exciting graphical displays showcasing this wager (fractional digit roll-up, or breakdown; a fractional digit mini-slot; or some other manifestation of a for-wager game) enable the player to leave the game on a high note. In the above given description, the game module is represented, in essence, as a single gameplay. It should be noted that in other conceptions of the invention, the player might have the opportunity to play multiple gameplays, or even have the ability to choose between several different game modules in order to play off the strictly fractional credit portion.

Figure 4:
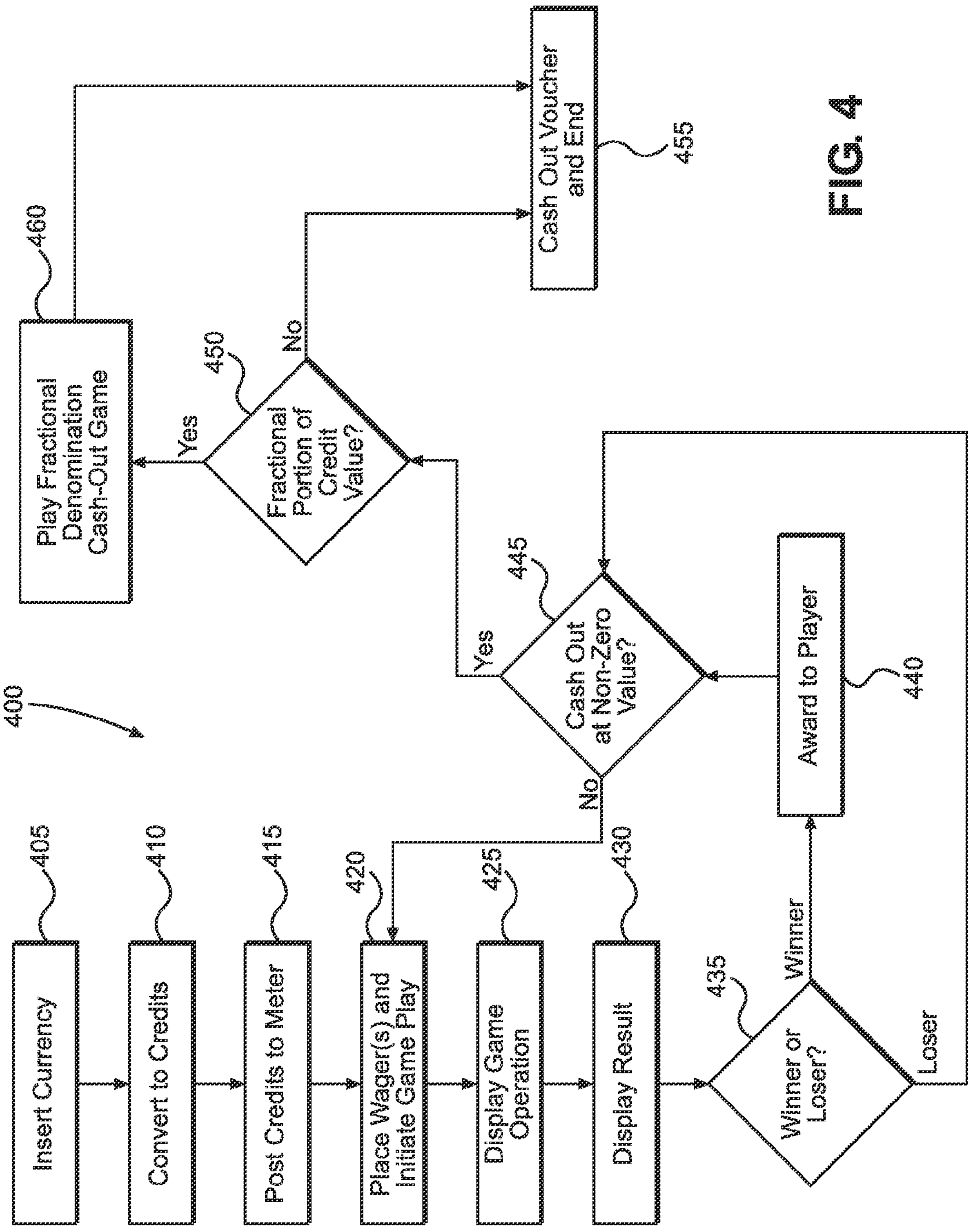
FIG. 4 shows a flow chart of a process for playing a game with a denomination that is expressed in fractions of a cent.

For the EGMs and connected networks shown in FIGS. 1-3, wagering, game play and cash-out on an EGM 101 follows a sequence of steps in a flow chart 400 of FIG. 4 and depicted in the sample screenshots of FIGS. 5A-E. The player begins at initial cash-in step 405 by inserting a bill or ticket with value into bill acceptor slot 107 on an EGM 101. Once the bill or ticket is accepted, the value of the bill or ticket is converted to credits at step 410. In the prior art, the credit value would have typically been, for example, an available recognized denomination: 1¢, 10¢, 25¢, $1, etc. However, according to the present invention, it is desirable to choose a credit value that is an acceptable fractional denomination credit value, as defined above. For example, each credit may be assigned a value of 1/10$^{th}$ of a cent or 0.1¢. In this case, the congruence multiple would be 10.

Figure 5A:
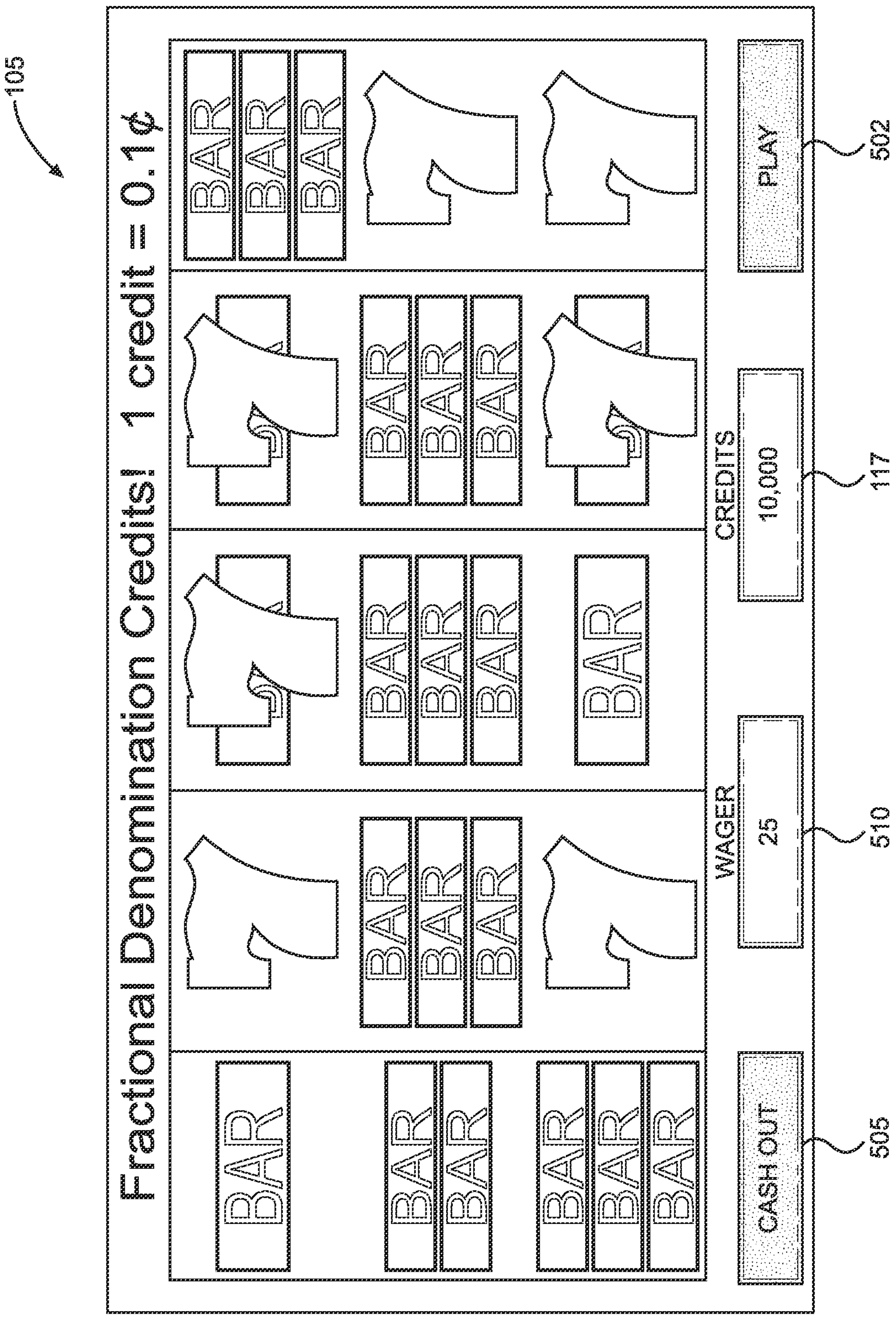
FIGS. 5A-F show screenshots of the progression of the process for playing a game with a denomination that is expressed in fractions of a cent corresponding to the flowchart of FIG. 4.
Figure 5B:
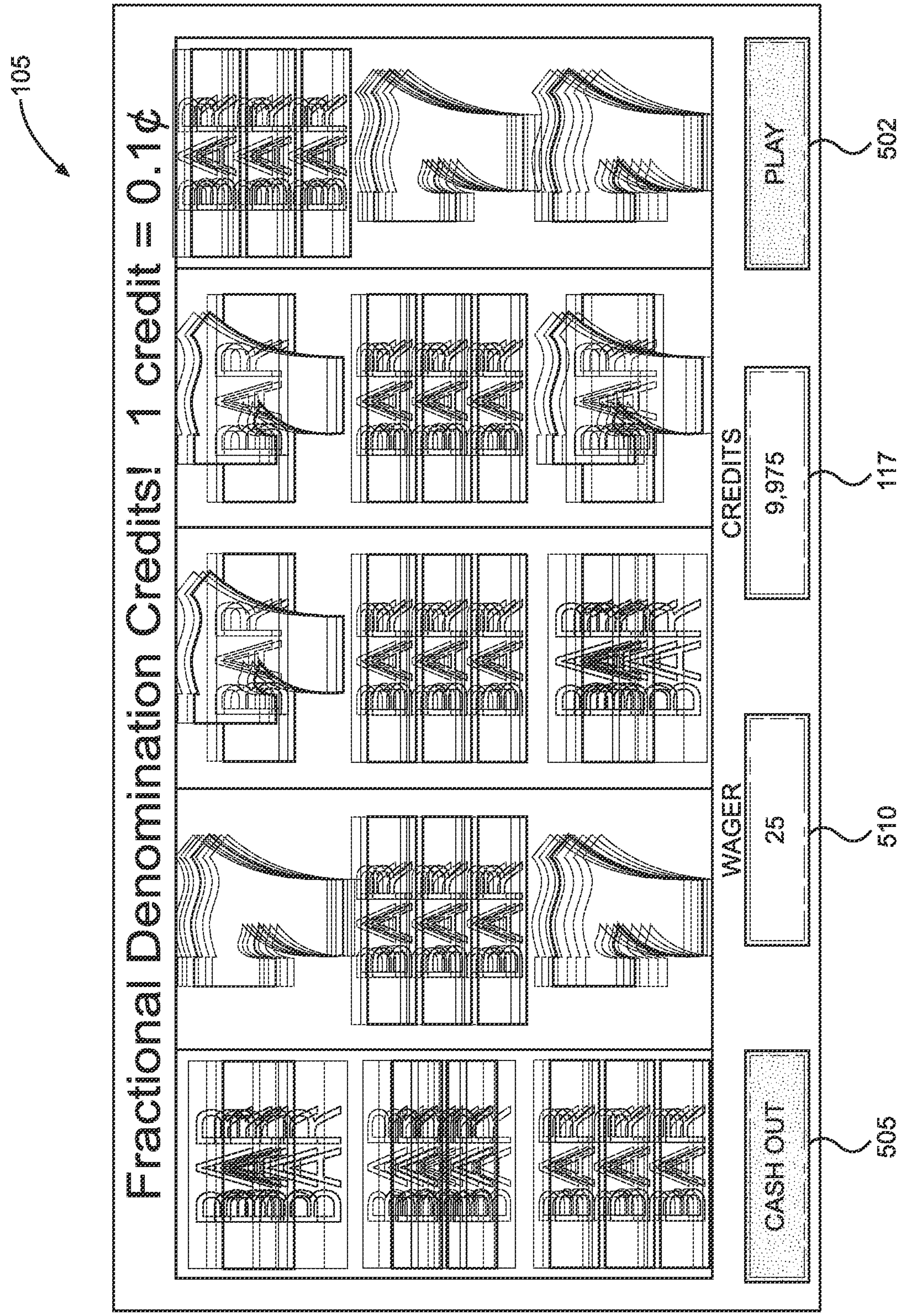
Figure 5C:
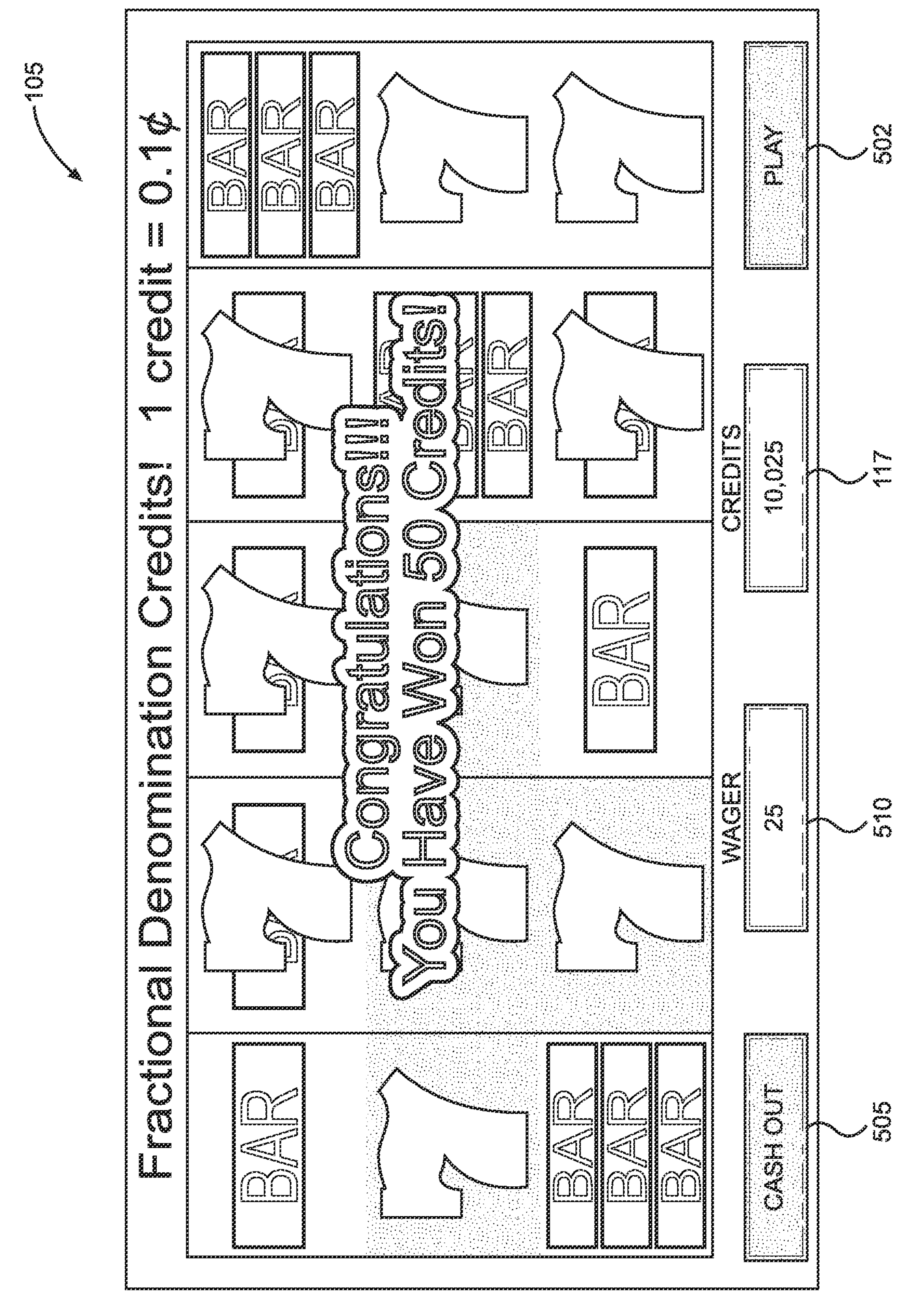
Figure 5D:
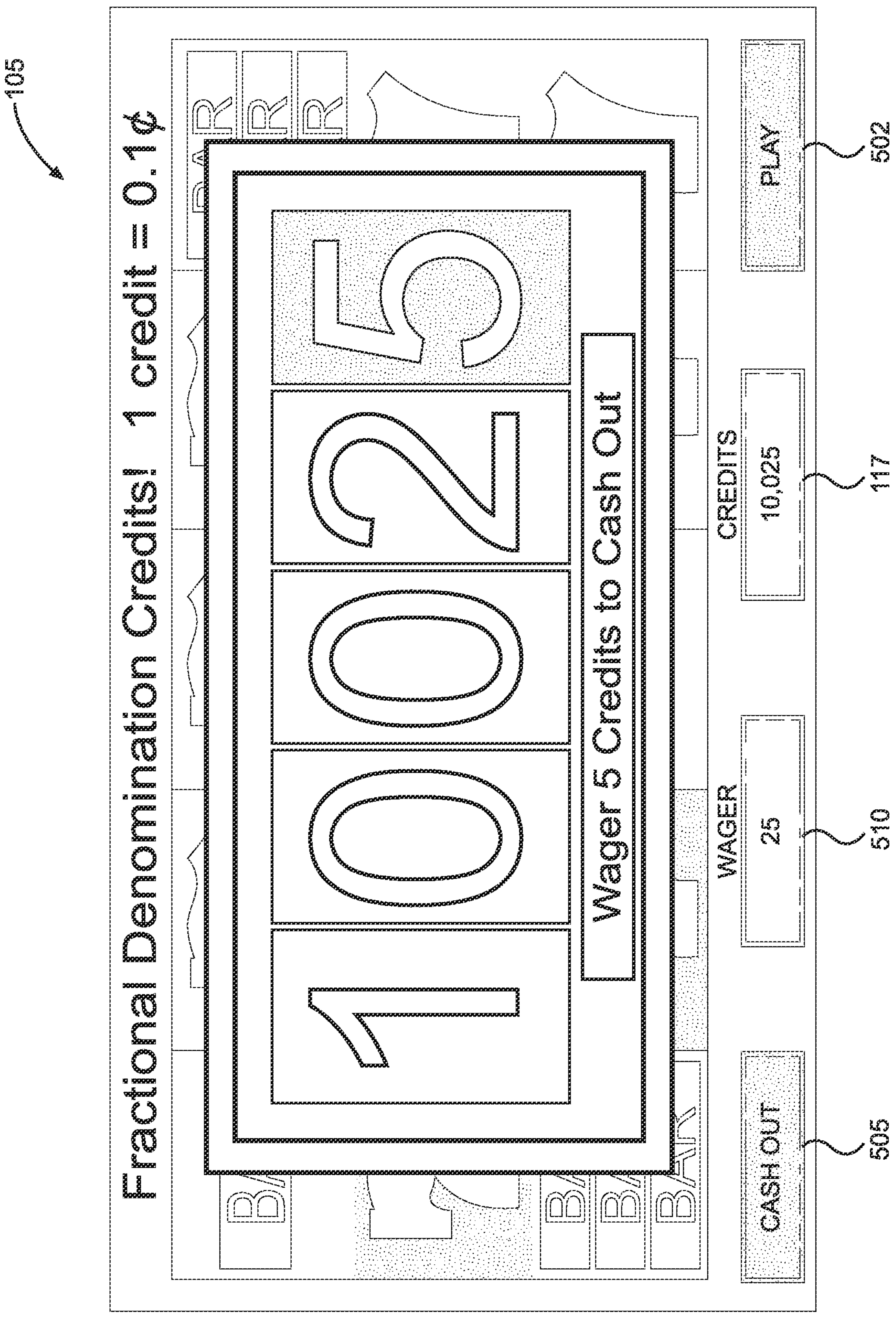

An illustrative example of the use of fractional denomination will now be presented. It should be understood that this illustration is but one example and that a wide variety of other uses of the invention will be apparent from this description. To start the process, a player might insert $10.00 into EGM 101 at step 405. In that case, the number of credits would be converted to 10,000 credits at step 410 with the value of 1 credit being equivalent to 0.1¢. The credits are posted to a credit meter 117 on EGM 101 at step 415 and as shown in FIG. 5A. Once the credits are posted, the player is given the opportunity to play the game by wagering one or more credits and initiating game play at step 420 by pressing "play" button 502. As an example, let's assume that the player makes a wager of 25 credits (or 2.5¢) as shown on wager value meter 510. Play begins and the game play is shown on the game displays 105, 115 at step 425 and in FIG. 5B where the number of credits after the current wager is 9,975. The result is then shown on the game displays 105, 115 at step 430 and in FIG. 5C. At the end of the game, it is determined whether the result of the game is a winner or a loser at step 435. If the result of the game play is a loser, the player will have 9,975 credits on meter 117. If the result of the game play is a winner as shown in FIG. 5C, the player is awarded additional credits at step 440. As an example, the player may be awarded 50 additional credits and the total number of credits on the credit meter is increased to 10,025 as shown in FIG. 5C. In either case, the player will be left with a nonzero strictly fractional credit portion. In order to identify the strictly fractional credit portion, we note that the congruence multiple is 10. Thus, since 9,975 mod 10=5, it follows that the strictly fractional credit portion of 9,975 is 5. Similarly, since 10,025 mod 10=5, we have that the strictly fractional credit portion of 10,025 is 5.

Figure 5E:
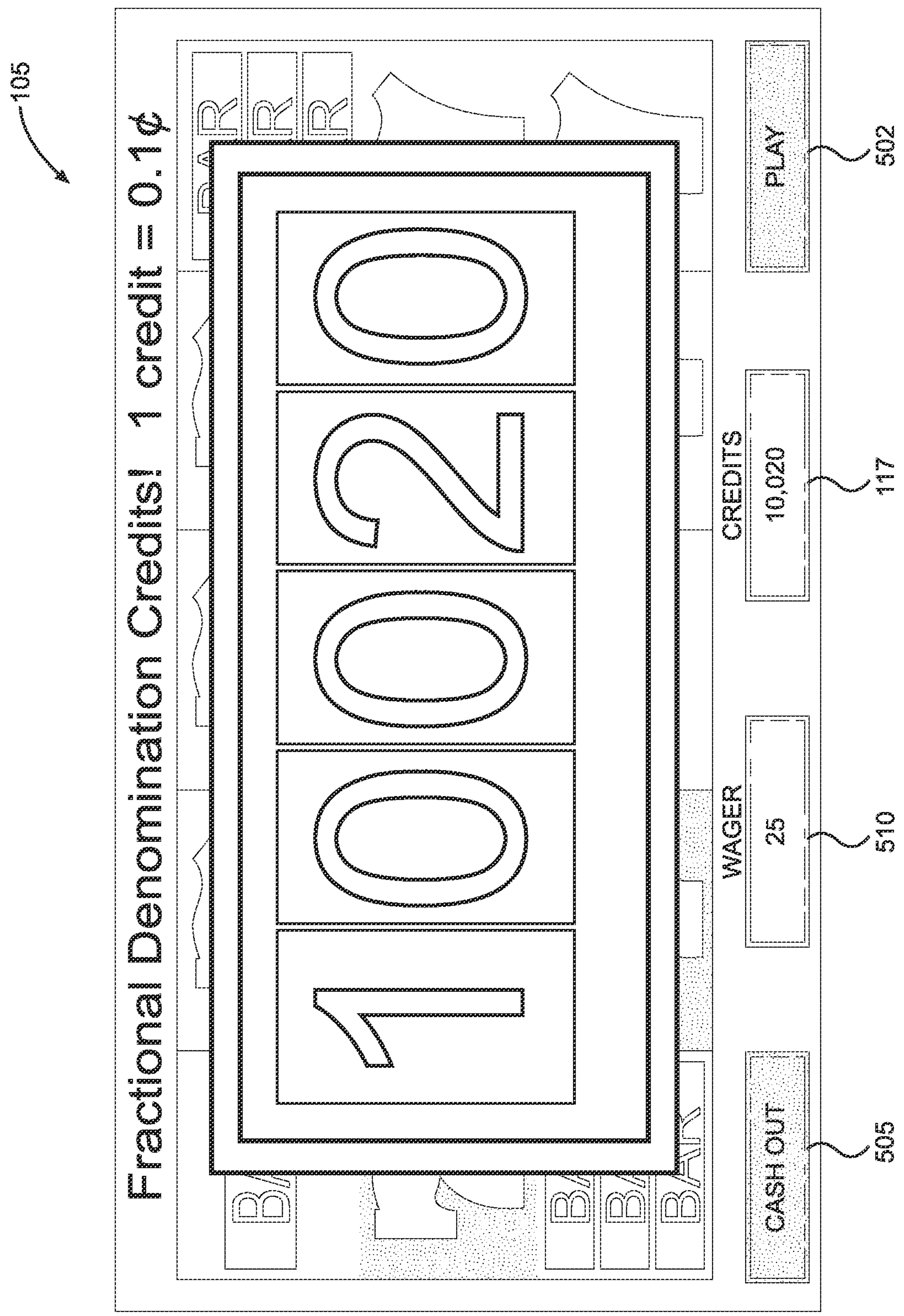
Figure 5F:
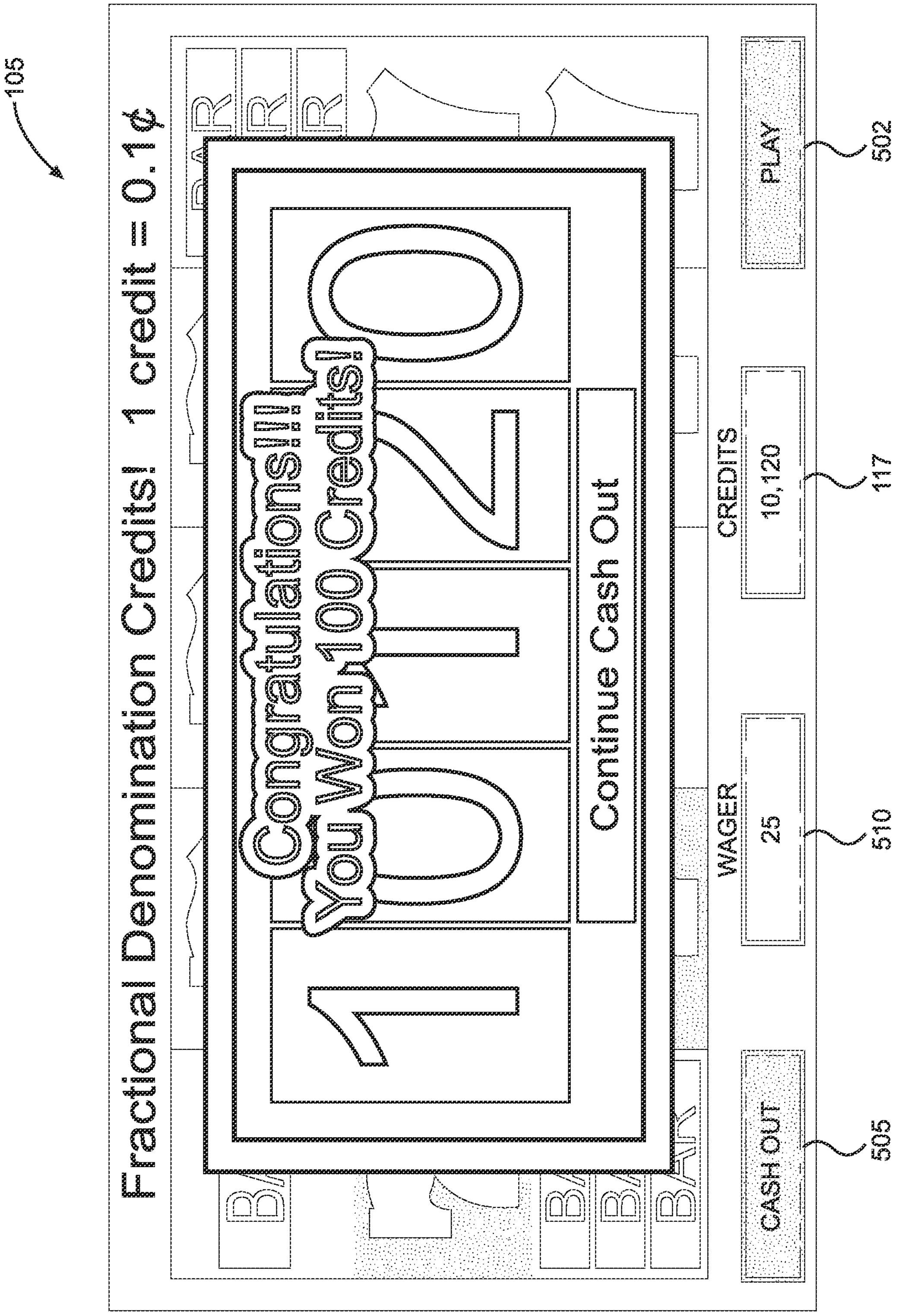

Therefore, whether the player has 9,975 credits after losing at step 435 or 10,025 credits after being awarded 50 credits at step 440, the player will have a nonzero strictly fractional credit portion. If the player decides not to cash-out and instead to continue play, s/he is returned to step 415 where the credits are shown on the meter. The cycle then continues at step 420 with the player placing a wager to initiate a new game. If the player decides to cash out at step 445, the player presses cash out button 505 on display 105 and the process moves to step 450. At that point, it is determined whether there is a nonzero fractional credit portion, as shown above, in the total credits that the player has posted on meter 117. If not, the player receives a cash-out voucher for the full value of the remaining credits at step 455. In the case that the player decides to cash-out and not continue playing in the example above, the player does have a nonzero strictly fractional credit portion of 5 credits in both the case that s/he lost or, alternatively, as shown on FIG. 5D, if s/he won. In either case, the player would then play a fractional denomination cash-out game after selecting the "wager 5 credits to cash out" button on display 105 as shown on FIG. 5D. The player may wager the entirety of the nonzero strictly fractional portion, either as one wager or as multiple wagers by playing a fractional denomination cash-out game at step 460. FIG. 5E shows a screenshot of the game after the wager of 5 credits has been placed with a total of 10020 credits being available. The outcome of the fractional denomination cash-out game would then result in either the fractional value being lost or a win of an amount that can be realized as a linear combination of recognized available denominations and consequently able to be paid out to the player. An example of a winning cash-out game is shown in FIG. 5F, where the player has won 100 credits and the total is now 10,120. With the number of credits not including a fractional portion (i.e. 10,120 mod 10=0), cash out can be completed in an exact amount of the lowest currency denomination. The total value of $10.12 could then be printed on a voucher for the player or issued in another form at the cash-out voucher step 455.

It should be understood that the fractional denomination cash-out game of step 460 has the ability to have a dynamic paytable reflecting the number of credits wagered so that the cash-out game experience can be tailored to the ratio of the wagered strictly fractional credit portion to the least available recognized denom. For example, a much more generous paytable for a wager of 9 credits is used as compared to that for a wager of 1 since 0.9 is so much closer to 1 than is 0.1. By generous, it is meant that the paytable may award a higher return percentage, have a higher hit percentage, yield higher win values, or some combination of these characteristics. For example, the following paytables may be established for a wager of 1 credit and a wager of 9 credits, respectively:

| 1 Credit | | 9 Credits | |
|---|---|---|---|
| Pay Multiplier | Probability | Pay Multiplier | Probability |
| 0 | 0.95 | 0 | 0.45 |
| 10 | 0.04 | 10 | 0.25 |
| 20 | 0.008 | 20 | 0.29 |
| 250 | 0.002 | 250 | 0.01 |

Wherein the return percentages are roughly equivalent, and the possible pay multipliers match; but the hit percentage is clearly far higher and the prize distribution skewed more heavily toward the higher prize values for the 9 credits wager than it is for the 1 credit wager.

In another illustrative example of this invention, a player may use a mobile device, such as a smartphone, tablet, or some other mobile computing device while playing a fractional denomination credit game on an EGM. Specifically, in the case that there is a nonzero strictly fractional credit portion in the player's credit amount on the EGM, that strictly fractional credit portion may be taken from the EGM and pushed onto the player's mobile device over a secure network. In this case, the player will aggregate fractional denomination credit amounts on his or her mobile device. The player may then play one or more strictly fractional denomination credit games on his or her mobile device using the aggregated credit portion. In the case that the credit amount on the mobile device accumulates sufficiently, either through winning a strictly fractional denomination game, or by the repeated aggregation of strictly fractional credit portions, to include a payable credit amount, that credit amount can be sent back to the EGM or some other machine connected over the secure network that is able to cash out payable credit amounts.

While the invention has been described with respect to the figures, it will be appreciated that many modifications and changes may be made by those skilled in the art without departing from the spirit of the invention. For example, instead of wagering the nonzero strictly fractional credit portion in a standalone for-wager game with a dynamic paytable, the player may have the option to buy-in to a community jackpot wherein, for example, 1 ticket may be purchased for one credit. All credits in the nonzero strictly fractional credit portion go into the jackpot pool. It may be set up such that a portion of the credits go into the prize pool and a portion of the credits go into the seed refund pool. In the case that this is a mystery jackpot it would be configured to hit by a certain, payable, credit amount. In any case, whoever draws the winning ticket will win the entire prize pool up to the greatest payable credit amount. The remainder would then be rolled over into the next prize pool. In another conception, the player might have the opportunity to enter into a tournament, potentially skill-based, in which the player is playing against other players. The size of the nonzero strictly fractional credit portion might determine the pool into which the player is entered. That is, there might be a 1 credit pool, a 2 credit pool, etc. It may also be the case that the size of the nonzero strictly fractional credit portion determines, in some manner, the probability of success, wherein a larger credit portion has some advantage over a smaller credit portion. In each of these cases, the credit portions from each of the players entered into the tournament would be aggregated in a prize pool which would then be split amongst the winners of the tournament in payable credit amounts. Any strictly fractional credit amount left over would then be rolled over into the next prize pool.

Any variation and derivation from the above description and drawings are included in the scope of the present invention as defined by the claims.

What is claimed is:

1. An electronic gaming machine ("EGM") on which a player plays a game and which uses credits that are valued in an amount that is equal to a fraction of the lowest currency denomination, comprising:

an acceptor that receives an item from a player;

a random number generator ("RNG") that generates random numbers that determine an outcome of the game and that correspond to a predefined set of game outcomes including winning and losing outcomes;

a display that displays game play including game outcomes to a player;

a meter that tracks the number of credits available for play;

an EGM interface through which the player interacts with the EGM; and a processor in communication with the wager acceptor, the RNG, the display and the EGM interface that receives the random numbers from the RNG, controls game play on the EGM, and upon receiving a wager in the wager acceptor, determines the monetary value of the item, converts the monetary value to a number of acceptable fractional denomination credits for use in the EGM and posts the number of credits on the meter, wherein the processor performs the following steps:

(a) accepts a wager;

(b) conducts a game;

(c) determines whether an outcome of the game is a winner or a loser;

(d) adjusts the number of credits on the meter to reflect the outcome of the game;

(e) returns to step (a) in the event the player elects to play another game, or continues to step (f) to enter a cash-out process;

(f) determines whether the credit amount on the meter contains a nonzero, strictly fractional credit portion, wherein if the credit amount does not contain a nonzero, strictly fractional credit portion, converts the credits to a currency value and issues a cash-out voucher to the player, and further wherein if the credit amount does contain a nonzero, strictly fractional credit portion, subtracts the strictly fractional credit portion from the credit amount to leave a cashable credit value;

(g) accepts the strictly fractional portion as a wager for a fractional denomination cash-out game wherein the outcome of the fractional denomination cash-out game provides a result that is either a cashable credit value or zero credits; and (h) converts any cashable credit value into a currency value and issues a cash-out voucher to the player.

2. The EGM of claim 1 wherein the result of the fractional denomination cash-out game is determined according to a dynamic paytable which changes according to the amount of the strictly fractional credit portion wager.

3. The EGM of claim 2 wherein a theoretical return percentage to the player for each fractional denomination cash-out wager is configurable.

4. The EGM of claim 1 wherein the acceptable fractional denomination credit is defined to be: (a) a specified value not equivalent to a recognized available denomination in a target currency; (b) less than a least available recognized denomination in a target currency; and (c) such that a positive integer multiple of the credit value is equivalent to the least available recognized denomination in the target currency.

5. The EGM of claim 1 wherein an acceptable fractional denomination credit amount comprises a first portion that is a payable portion and a second portion that is a strictly fractional portion, wherein the payable portion is zero or a number of credits that is convertible to the least available recognized denomination in a target currency and further wherein the strictly fractional portion multiplied by a whole number results in a number of credits that is convertible to the least available recognized denomination.

6. An electronic gaming machine ("EGM") on which a player plays a game and which uses credits that are valued in an amount that is equal to a fraction of the lowest currency denomination, comprising:

an acceptor that receives an item from a player;

a random number generator ("RNG") that generates random numbers that determine an outcome of the game and that correspond to a predefined set of game outcomes including winning and losing outcomes;

a display that displays game play including game outcomes to a player;

a meter that tracks the number of credits available for play;

an EGM interface through which the player interacts with the EGM; and a processor in communication with the wager acceptor, the RNG, the display and the EGM interface that receives the random numbers from the RNG, controls game play on the EGM, and upon receiving a wager in the wager acceptor, determines the monetary value of the item, converts the monetary value to a number of acceptable fractional denomination credits for use in the EGM and posts the number of credits on the meter, wherein the processor performs the following steps:

(a) receiving an item having monetary value into the EGM;

(b) determining the monetary value of the item;

(c) converting the monetary value of the item to an equivalent number of acceptable fractional denomination credits using an EGM processor;

(d) posting the equivalent number of credits on the meter;

(e) accepting a wager;

(f) conducting a game on the EGM;

(g) determining whether an outcome of the game is a winner or a loser;

(h) adjusting the number of credits on the meter to reflect the outcome of the game;

(i) returning to step (e) in the event the player elects to play another game, or continuing to step (j) to enter a cash-out process;

(j) determining whether the credit amount on the meter contains a nonzero, strictly fractional credit portion, wherein if the credit amount does not contain a nonzero, strictly fractional credit portion, converting the credits to a currency value and issuing a cash-out voucher to the player, and further wherein if the credit amount does contain a nonzero, strictly fractional credit portion, subtracting the strictly fractional credit portion from the credit amount to leave a cashable credit value;

(k) accepting a wager of the strictly fractional portion;

(l) playing a fractional denomination cash-out game wherein the outcome of the fractional denomination cash-out game provides a result that is either a cashable credit value or zero credits; and (m) converting any cashable credit value into a currency value and issuing a cash-out voucher to the player; and wherein the acceptable fractional denomination credit is defined to be: (i) a specified value not equivalent to a recognized available denomination in a target currency; (ii) less than a least available recognized denomination in a target currency; and (iii) such that a positive integer multiple of the credit value is equivalent to the least available recognized denomination in the target currency.

7. The EGM of claim 6 wherein an acceptable fractional denomination credit amount comprises a first portion that is a payable portion and a second portion that is a strictly fractional portion, wherein the payable portion is zero or a number of credits that is convertible to the least available recognized denomination in a target currency and further wherein the strictly fractional portion multiplied by a whole number results in a number of credits that is convertible to the least available recognized denomination.

8. The EGM of claim 6 wherein the result of the fractional denomination cash-out game is determined according to a dynamic paytable.

9. The EGM of claim 8 wherein a theoretical return percentage to the player for each fractional denomination wager is configurable.

10. A method of playing a game on an electronic gaming machine ("EGM"), the method using credits that are valued in an amount that is equal to a fraction of the least available recognized denomination in a given currency, comprising the steps of:

(a) receiving an item having monetary value into the EGM;
(b) determining the monetary value of the item;
(c) converting the monetary value of the item to an equivalent number of acceptable fractional denomination credits using an EGM processor;
(d) posting the equivalent number of credits on a credit meter;
(e) accepting a wager;
(f) conducting a game on the EGM;
(g) determining whether an outcome of the game is a winner or a loser;
(h) adjusting the number of credits on the meter to reflect the outcome of the game;
(i) returning to step (e) in the event the player elects to play another game, or continuing to step (j) to enter a cash-out process;
(j) determining whether the credit amount on the meter contains a nonzero, strictly fractional credit portion, wherein if the credit amount does not contain a nonzero, strictly fractional credit portion, converting the credits to a currency value and issuing a cash-out voucher to the player, and further wherein if the credit amount does contain a nonzero, strictly fractional credit portion, subtracting the strictly fractional credit portion from the credit amount to leave a cashable credit value;
(k) accepting the strictly fractional portion as a wager for a cash-out game;
(l) conducting a fractional denomination cash-out game wherein the outcome of the fractional denomination cash-out game provides a result that is either a cashable credit value or zero credits; and
(m) converting any cashable credit value into a currency value and issuing a cash-out voucher to the player.

11. The method of claim 10 wherein the result of the fractional denomination cash-out game is determined according to a dynamic paytable which changes according to the amount of the strictly fractional credit portion wager.

12. The method of claim 11 wherein a theoretical return percentage to the player for each fractional denomination cash-out wager is configurable.

13. The method of claim 10 wherein the acceptable fractional denomination credit is defined to be: (a) a specified value not equivalent to a recognized available denomination in a target currency; (b) less than a least available recognized denomination in a target currency; and (c) such that a positive integer multiple of the credit value is equivalent to the least available recognized denomination in the target currency.

14. The method of claim 10 wherein an acceptable fractional denomination credit amount comprises a first portion that is a payable portion and a second portion that is a strictly fractional portion, wherein the payable portion is zero or a number of credits that is convertible to the least available recognized denomination in a target currency and further wherein the strictly fractional portion multiplied by a whole number results in a number of credits that is convertible to the least available recognized denomination.

15. A method of playing a game on an electronic gaming machine ("EGM"), the method using credits that are valued in an amount that is equal to a fraction of the least available recognized denomination in a target currency, the method comprising the steps of:

(a) accepting an item having monetary value into the EGM;
(b) determining the monetary value of the item;
(c) converting the monetary value of the item to an equivalent number of acceptable fractional denomination credits using an EGM processor;
(d) posting the equivalent number of credits on a credit meter;
(e) accepting a wager;
(f) conducting a game on the EGM;
(g) determining whether an outcome of the game is a winner or a loser;
(h) adjusting the number of credits on the meter to reflect the outcome of the game;
(i) returning to step (e) in the event the player elects to play another game, or continuing to step (j) to enter a cash-out process;
(j) determining whether the credit amount on the meter contains a nonzero, strictly fractional credit portion, wherein if the credit amount does not contain a nonzero, strictly fractional credit portion, converting the credits to a currency value and issuing a cash-out voucher to the player, and further wherein if the credit amount does contain a nonzero, strictly fractional credit portion, subtracting the strictly fractional credit portion from the credit amount to leave a cashable credit value;
(k) accepting a wager for the strictly fractional portion;
(l) playing a fractional denomination cash-out game wherein the outcome of the fractional denomination cash-out game provides a result that is either a cashable credit value or zero credits;
(m) converting any cashable credit value into a currency value and issuing a cash-out voucher to the player wherein the acceptable fractional denomination credit is defined to be: (i) a specified value not equivalent to a recognized available denomination in a target currency; (ii) less than a least available recognized denomination in a target currency; and (iii) such that a positive integer multiple of the credit value is equivalent to the least available recognized denomination in the target currency; and wherein the acceptable fractional denomination credit is defined to be: (i) a specified value not equivalent to a recognized available denomination in a target currency; (ii) less than a least available recognized denomination in a target currency; and (iii) such that a positive integer multiple of the credit value is equivalent to the least available recognized denomination in the target currency.

16. The method of claim 15 wherein an acceptable fractional denomination credit amount comprises a first portion that is a payable portion and a second portion that is a strictly fractional portion, wherein the payable portion is zero or a number of credits that is convertible to the least available recognized denomination in a target currency and further wherein the strictly fractional portion multiplied by a whole number results in a number of credits that is convertible to the least available recognized denomination.

17. The method of claim 15 wherein the result of the fractional denomination cash-out game is determined according to a dynamic paytable.

18. The method of claim 17 wherein a theoretical return percentage to the player for each fractional denomination wager is configurable.

* * * * *